United States Patent Office 3,365,510
Patented Jan. 23, 1968

3,365,510
LOW TEMPERATURE CONVERSION OF
ACETYLENE TO PURE BENZENE
John E. Noakes, P.O. Box 117,
Oak Ridge, Tenn. 37830
No Drawing. Filed Jan. 11, 1965, Ser. No. 424,804
10 Claims. (Cl. 260—673)

ABSTRACT OF THE DISCLOSURE

High purity benzene, particularly useful in radiocarbon dating because of its purity, is made using a low temperature, 25° C. to 100° C., pure gas phase system. Under these reaction conditions a metal ion having a valence of +5 or +6 induces polarization and initiates the trimerization of acetylene gas to benzene. Oxides of metals of Group V–B and VI–B of the Periodic Table are employed on an activated alumina carrier.

---

This invention in one of its aspects pertains to the synthesis of benzene. In a more specific aspect the invention relates to the preparation of benzene of such high purity that it can be used in radiocarbon dating.

When cosmic rays enter the earth's atmosphere they collide with various atoms in the air to form neutrons, mesons, protons and other particles. Some of the resulting neutrons strike nitrogen atoms causing them to disintegrate, giving off a proton. The result is carbon 14 or radiocarbon. Living things constantly absorb carbon 14 from the atmosphere. This discovery of carbon 14 in nature led to its development as an archaeological and geological calendar.

In dating organic matter by its carbon 14 content, the sample is usually burned to convert it to carbon dioxide. By one method, carbon dioxide is reduced to pure, solid, carbon by hot magnesium metal (about 600° C.), and a Geiger counter for solids is employed for counting the radioactive particles. Preferably the carbon dioxide is converted to acetylene which is then trimerized to benzene for liquid scintillation counting. The carbon dioxide is converted to acetylene by reaction with lithium at 700° C. and then with water at a low temperature.

Radiocarbon dating by low-level liquid scintillation counting was first suggested in 1953, and later applied successfully in 1954. The high sensitivity and precision in radiocarbon dating by use of liquid scintillation are due to the large amount of carbon which can be incorporated into liquid samples and counted with high efficiency. The conversion of carbon samples to benzene is preferred because of benzene's excellent liquid scintillation counting properties (high energy transmitting property and low optical density) and its high carbon content (92 percent). With recent improvements in liquid scintillation spectrometry, such as summation counting, and the development of wide response quartz-faced phototubes (3000 A.–4500 A.), counting efficiencies approaching 90 percent have been realized with benzene samples. Nevertheless, in the past the advantages of liquid scintillation have been offset by the difficulties involved in the complex synthesis required for liquid sample preparation. Thus, benzene has been partially formed by the cyclic trimerization of acetylene at 500° C. However, this process has the disadvantage that the high temperature required at this stage enhances the formation of compounds other than benzene which are poor scintillating solvents and also increases the possibility of carbon isotope fractionation. A process is preferred whereby benzene can be synthesized from acetylene gas at near ambient temperature which will yield only pure benzene and no carbon isotope fractionation.

The conversion of acetylene to benzene at a temperature below 500° C. has been described in J. Amer. Chem. Soc., 79, 3294, 1957. This method involves passing the acetylene gas over a catalyst of silica gel, reacted, after removal of absorbed water, with diborane. The fact that boron hydrides have a catalytic effect on the polymerization of acetylenes poses the question of whether the attached boron, the aluminum, or the silicon atoms are the sites of attachment for acetylene molecule. This invention is a result of the study of this reaction. While the affinity of boron for electrons would seem to be sufficient to initiate attachment and to induce polarization and cyclization of acetylene to benzene, it appears that the close proximity of the boron hydride group to the aluminum and silicon atoms shifts their pi cloud to the boron, thereby increasing the Lewis acid character of the +4 silicon atoms. Based on these studies it has been found that outstanding alumina based promoters or catalysts for benzene synthesis can be made by combining alumina with a metal oxide which possesses strong Lewis acid properties. By this invention, no hazardous diborane gas or other activating gas is needed to enhance the Lewis acid character of the promoter.

Thus, in accordance with this invention an ambient temperature process is provided which converts acetylene to benzene in a manner ideally suited for liquid scintillation radiocarbon dating. Impure benzene cannot be tolerated for liquid scintillation counting and radiocarbon dating. Purity is therefore of primary importance, and of secondary importance is the greater chance in known methods for carbon isotope fractionation. According to the practice of the invention a process is provided for synthesizing pure benzene from acetylene by passing the acetylene over the surface of an alumina based promoter at a temperature below 150° C., and as low as room temperature (25° C.). The promoter, in part is activated alumina, that is, aluminum oxide which has been calcined, or otherwise heated with steam or air, etc., to raise its surface area above 29 say, 30 to 400 square meters per gram or higher, preferably 100 to 350. This promoter also contains at least 3, and preferably 5 to 25 weight percent based on the total, of the metals oxide possessing strong Lewis acid properties. Such oxides are those oxides in group V–B and VI–B of the Periodic Table having valences greater than four. Thus in the oxide employed herein the valence V of the metal is $4 < V < 7$. Such metal oxides are $V_2O_5$, $Nb_2O_5$, $Ta_2O_5$, $CrO_3$, $MoO_3$, $WO_3$ and $Mo_2O_5$. Normally there is no advantage to employing more than 30 weight percent metal oxide based on the catalyst.

A postulated mechanism for the functioning of these catalysts is that the presence of cations of +5 or greater valence on large surface area give maximum exposure of strong Lewis acid sites for attachments of acetylene molecules. Acetylene molecules in the gaseous state coming in the vicinity of the +5 cation site are then polarized. In addition, induced polarization is set up in the attached acetylene molecule. As a result additional acetylene molecules are attracted to this attached acetylene molecule. When three molecules of acetylene are thus attached, angular rotation is possible and a ring structure of benzene is thereby formed. At higher temperatures, say above 100° C. the ring formation sometimes does not take place until after more than three acetylene molecules become so attached to a catalyst site, resulting in ethyl benzene being synthesized, thereby decreasing the benzene yield. Hence a temperature of 25° C. to 65° C. is preferred, in the absence of reaction chamber cooling to compensate for the exotherm.

In preparing benzene according to the practice of this invention the acetylene is passed through the catalyst mass. As indicated, the catalyst thus contacted contains an alumina base material making available a large surface area. Thus vanadium oxide on alumina has been found to give excellent results with alumina having a surface area of 214 square meters per gram, but poor results using the same amount of vanadium oxide on alumina having a surface area of one square meter per gram. The rate of acetylene gas introduction over the preheated catalyst is related to both the temperature and the benzene synthesis yield. Investigation of the reaction shows that the catalyst reaction temperature and the acetylene flow rate are directly related, whereas the benzene yield and the acetylene flow rate are inversely related. The exact flow rate consequently depends upon reaction conditions, but normally it will be in the range of 5 cc. per min. to 25 cc. per min.

Normally the catalyst involved is heated at an elevated temperature (300° C. under vacuum) to extract water vapor. Recent studies have shown that the catalyst will react if not dehydrated, but the dehydration step increases benzene synthesis and enables pure benzene to be extracted devoid of any water. The catalyst is then cooled and stored under nitrogen gas until ready for use. After completion of the cyclization reaction of acetylene to form benzene, benzene can be extracted from the catalyst by placing the reaction column in an oven heated to about 100° C. An applied vacuum is pulled on the column to extract the benzene, which is collected in a liquid nitrogen freeze-out trap. An extraction of 100° C. is used so that if any higher molecular material is synthesized its boiling point will keep it in the column.

In addition to the fact that benzene can be made at ambient temperatures, another advantage of this invention is that the benzene produced by this process is extremely pure. Benzene extracted from the reaction column was checked for purity by infra-red and gas chromatography. The only product found other than benzene has been ethyl benzene and only in trace amounts. In addition the ethyl benzene was found to occur only at high temperatures when a large acetylene flow rate was used. As the yield increases only pure benzene is obtained. In addition, mass spectrometric analysis of benzene produced shows that no carbon isotope fractionation was present in either low or high yield benzene reactions.

In order to determine whether a valence of 5 or 6 is necessary as set forth hereinbefore, nine known catalytic materials were selected for initial study for their ability to enhance the cyclization of acetylene gas to liquid benzene. The preparation of such catalysts is well known and since all of these catalysts were obtained commercially, their composition but not their manner of preparation is given herein:

CATALYSTS

I. Fe Cat.—$Fe_2O_3$, 20%; $Al_2O_3$, 80%; S.A., 41 m.²/g.
II. Mn Cat.—$MnO_2$, 19%; $Al_2O_3$, 81%; S.A., 69 m.²/g.
III. Co Cat.—CoO, 10%; $Al_2O_3$, 90%; S.A., 60 m.²/g.
IV. Pt Cat.—$PtO_2$, 0.5%; $Al_2O_3$, 99.5%; S.A., 165 m.²/g.
V. Al Cat.—$Al_2O_3$, 98%; S.A., 160 m.²/g.
VI. Si-Al Cat.—$SiO_2$, 87.3%; $Al_2O_3$, 12.4%; S.A., 300 m.²/g.
VII. Mo Cat.—$MoO_3$, 10%; $Al_2O_3$, 90%; S.A., 160 m.²/g.
VIII. Mo-Co Cat.—$MoO_3$, 12%; CoO, 3%; $Al_2O_3$, 85%; S.A., 330 m.²/g.
IX. V Cat.—$V_2O_5$, 10%; $Al_2O_3$, 90%; S.A., 214 m.²/g.

S.A.=Surface area, g.= grams of catalyst, m.²=meters square.

PROCEDURE

In order to prepare the benzene using the foregoing catalysts, the catalysts were first dehydrated. This pretreatment was limited to the elimination of associated water so that no water would be present in the formed benzene, the catalyst being heated for two hours under vacuum at 200° C. The acetylene catalysis was accomplished by passing acetylene gas through the catalyst mass at a controlled rate as given in the following tables. The acetylene was obtained from tank acetylene and the flow rate regulated by a Mathenson Gas Proportioner with an accuracy of ±2%. The catalytic acetylene reaction was exothermic and was accompanied by a darkening of the catalyst material. To insure that no excessive acetylene pressures would build up during the reaction an exhaust valve and displacement trap were connected to the reaction column to allow gas of greater than one atmosphere to escape and to be collected.

Using the foregoing procedure and a flow rate of 22.5 cc./min. acetylene was obtained in some instances and not in others as set forth in the following table:

TABLE I.—BENZENE SYNTHESIS WITH DEHYDRATED CATALYTIC MATERIALS

Conditions:
  Catalyst: As given.
  Feed stream: Acetylene.
  Flow rate: 22.5 cc./min.
  Reaction temperature: As given.

| Catalyst | $C_2H_2$ Reaction Temp. (° C.) | Benzene Yield (Percent) |
| --- | --- | --- |
| I. Fe Cat | 30 | Trace |
| II. Mn Cat | 32 | Trace |
| III. Co Cat | 32 | Trace |
| IV. Pt Cat | 28 | None |
| V. Al Cat | 25 | None |
| VI. Si-Al Cat | 38 | None |
| VII. Mo Cat | 35 | 8 |
| VIII. Mo-Co Cat | 70 | 50.3 |
| IX. V Cat | 70 | 50 |

While optimum conditions were not known at the time, results set forth in Table I show that alumina promoted with oxides of metals in a valence state of four or less do not promote the cyclic trimerization of acetylene, whereas oxides of Group V–B and VI–B metals when present in a valence state of +5 or +6 do promote the reactions. In fact later work showed that $Cr_2O_3$ does not work, whereas $CrO_3$ does.

Table I also shows that catalysts are improved by cobalt modification. One to five percent is usually employed based on the catalyst. To further investigate the effect of cobalt on molybdenum oxide catalysts additional cobalt molybdate catalysts were purchased and examined. For the purposes of comparison with catalysts VII and VIII of Table I, several additional catalysts were selected. The compositions of these catalysts were as follows:

CATALYSTS

X. Co Cat.—CoO, 5%; CuO, 5%; S.A., 59 m.²/g.
XI. Mo-Co Cat.—$MoO_3$, 19.4%; CoO, 3.4%; $Al_2O_3$, 77.2%; S.A., 218 m.²/g.
XII. Mo-Co Cat.—$MoO_3$, 14.6%; CoO, 3.2%; $Al_2O_3$, 83.2%; S.A., 330 m.²/g.

Results obtained by the use of these promoters in accordance with the procedures set forth were as follows:

TABLE II.—BENZENE SYNTHESIS WITH COBALT CATALYSTS

Conditions:
  Catalyst: As given.
  Feed stream: Acetylene.
  Flow rate: 22.5 cc./min.
  Reaction temperature: As given.

| Catalyst | Reaction Temp., ° C. | Benzene Yield (Percent) |
| --- | --- | --- |
| X. Co Cat | 25 | None |
| XI. Mo-Co Cat | 100 | 51.4 |
| XII. Mo-Co Cat | 110 | 54.6 |
| VIII. Mo-Co Cat. (from Table 1) | 70 | 50.3 |

Based on the results obtained as shown in Table II, cobalt molybdate catalysts were selected for use in studying other variables in this benzene synthesis process. One such variable is the dehydration period and another variable is the flow rate. The dehydration period was evaluated by heating the catalyst for 2, 4 and 6 hours to determine the effect of this heat treatment on the benzene yield. The results of this study are given in Table III.

TABLE III.—DEHYDRATION OF Mo-Co CATALYST

Conditions:
 Catalyst: XII—Mo-Co cat.
 Feed stream: Acetylene.
 Flow rate: 22.5 cc./min.
 Dehydration temperature: 300° C.

| Dehydration period: | Benzene yields, percent |
|---|---|
| 2 hours | 54.4 |
| 4 hours | 73.0 |
| 6 hours | 70.2 |

To investigate the flow rate variable, acetylene flow rates were varied from 6.5 cc./min. to 22.5 cc./min. at five different temperatures. At these flow rates, several determinations were made as shown in Table IV.

TABLE IV.—ACETYLENE FLOW RATE STUDY

Conditions:
 Catalyst: XII—Mo-Co cat.
 Feed stream: Acetylene.
 Flow rate: As given.
 Reaction temperature: As given.

| Sample | $C_2H_2$ Flow Rate | Max. Catalyst Reaction Temp. (° C.) | $C_6H_6$ Yield, (Percent) |
|---|---|---|---|
| 1 | 6.5 | 62 | 92.3 |
| 2 | 6.5 | 66 | 91.0 |
| 3 | 6.5 | 62 | 97.7 |
| 4 | 6.5 | 62 | 97.7 |
| 5 | 17.6 | 100 | 74.1 |
| 6 | 17.6 | 100 | 83.1 |
| 7 | 27.5 | 120 | 59.8 |
| 8 | 27.5 | 120 | 53.2 |
| 9 | 27.5 | 120 | 52.0 |
| 10 | 38.5 | 155 | 35.1 |
| 11 | 38.5 | 155 | 25.9 |
| 12 | 38.5 | 155 | 39.0 |
| 13 | 50.0 | 188 | 20.8 |
| 14 | 50.0 | 188 | 16.9 |

As shown in Table IV, at 62° C. an excellent yield was obtained at a flow rate of 6.5 cc. per min. At higher temperatures wherein it was necessary to increase the flow rate, a decrease in benzene yield is shown.

Gas chromatography and infra-red analyses were made on the benzene synthesized from samples 1 through 4 of Table IV. The benzene samples were obtained by extracting the benzene from the catalyst under vacuum of 100° C. for two hours. The gas chromatograph utilized was a Baker-Coleman IDS model 20, equipped with a 100 ft. column filled with Apiezon "L," a solid absorbent which is well suited for analyzing non-polar aromatic materials at temperatures up to 250° C. Analyses were run on 0.01 ml. samples by injecting 1 microliter aliquot into the chromatograph and splitting them 100 to 1. Analysis of a number of benzene samples showed the benzene purity to vary from 98–100% with acetone being the primary contamination and trace amounts of water and ethyl benzene also present. The water content was attributed to atmospheric moisture and incomplete catalyst dehydration and was eliminated by collecting the benzene in an inert atmosphere and dehydration for four hours. The presence of acetone was found to be contributed as a contaminate in tank acetylene (acetylene stored in acetone and charcoal) and was, therefore, not considered as a product of the synthesis. Ethyl benzene was found to be highest in low yield samples and diminished to undetectable amounts as benzene samples approached yields greater than 90%.

Infra-red analyses were made with a Beckman IR-10 model using a $CaF_2$ cell with a $200\mu$ length light path. The range of wave numbers scanned for each analysis was from 1000 to 4000. The presence of acetone and trace amounts of water and ethyl benzene was confirmed only in the benzene samples of low yield.

$^{13}C/C^{12}$ mass spectrometric analysis of tank acetylene and benzene synthesized from the tank acetylene were carried out to determine if any carbon isotope fractionation was occurring during the benzene synthesis. The ratios of the peaks corresponding to the mass 28 and mass 27 molecules of acetylene for five separate analyses gave an average value of 0.0220. Using Beynon's formula for calculating percent $^{13}C$ abundance, a value of 1.07 percent $^{13}C$ was calculated.

The ratio of atomic mass units (79/78) of benzene were determined for seven benzene samples, ranging from low to high yields. No variation in the $^{13}C/C^{12}$ mass ratios was observed for low or high yield samples. The average $^{13}C/C^{12}$ value for the seven benzene samples analyzed was 0.0655. The calculated percent $^{13}C$ abundances for acetylene and benzene to be 1.07 percent. The percent $^{13}C$ abundance calculations using the mass ratio data is reliable for three significant figures.

Thus according to this invention a low temperature method is provided for the quantitative synthesis of a pure benzene which has no energy quenching products present and which does not require purifying distillation procedures. The benzene thus produced is ideally suited as a scintillation solvent. The foregoing evaluations show a considerable latitude in the preparation of benzene by the processes of this invention. Such changes as flow rate, temperature, percent Group V–B and Group VI–B metal oxides will be obvious to one familiar with the art. Such variations and modifications are deemed to be within the scope of this invention.

What is claimed is:

1. A process for synthesizing substantially pure benzene by cyclic trimerization of acetylene which comprises trimerizing the acetylene in the gaseous phase at a temperature of 20° to 150° C. by bringing it into contact at said temperature with an oxide of one of the metals of Group V–B and Group VI–B of the Periodic Table having a valence $V$ of $4<V<7$, the oxide being supported on an activated alumina carrier, the metal being in said valence state in the oxide to confer Lewis acid properties on the combination, said carrier containing 3 to 30 weight percent of said oxide based on the total.

2. The process of claim 1 wherein the cyclic trimerization temperature is 25° C. to 100° C., wherein the alumina support has a surface area of 30 to 400 square meters per gram and wherein the Group V–B—Group VI–B metal oxide is present in amount of 5 to 25 weight percent based on the total.

3. The process of claim 1 wherein the alumina has a surface area of 100 to 350 square meters per gram, wherein the Group V–B—Group VI–B metal oxide is employed in an amount of 5 to 25 weight percent based on the total, and wherein said oxide is present in combination with 1 to 5 weight percent based on the total of CoO.

4. In radiocarbon dating by low-level liquid scintillation counting using benzene as the scintillator, wherein organic matter to be dated is burned to form carbon dioxide which contains carbon 14, the carbon dioxide being converted into acetylene, which then is converted into benzene by cyclic trimerization, the step of producing the benzene by the process of claim 1.

5. The process of claim 3 wherein the CoO is present in an amount of 3.2 weight percent and the oxide conferring Lewis acid properties is present in an amount of 10 weight percent.

6. The process of claim 3 wherein the oxide conferring Lewis acid properties is $V_2O_5$.

7. The process of claim 3 wherein the oxide conferring Lewis acid properties is $Ta_2O_5$.

8. The process of claim 3 wherein the oxide conferring Lewis acid properties is $CrO_3$.

9. The process of claim 3 wherein the oxide conferring Lewis acid properties is $MoO_3$.

10. The process of claim 3 wherein the oxide conferring Lewis acid properties is $WO_3$.

References Cited

UNITED STATES PATENTS 2,846,490  12/1953  Witt _____ 260—673
2,990,434  6/1961  Smith _____ 260—673

PAUL M. COUGHLAN, Jr., *Primary Examiner.*

DELBERT E. GANTZ, *Examiner.*

J. D. MYERS, *Assistant Examiner.*